United States Patent [19]
Sato et al.

[11] Patent Number: 5,202,805
[45] Date of Patent: Apr. 13, 1993

[54] ROTARY MAGNETIC HEAD APPARATUS

[75] Inventors: Kazuhiko Sato; Masami Kimura; Takayoshi Yoshida; Noriaki Kaneko, all of Yamagata, Japan

[73] Assignee: Pioneer Electronic Corporation, Tokyo, Japan

[21] Appl. No.: 650,375

[22] Filed: Jan. 30, 1991

[30] Foreign Application Priority Data

Jul. 27, 1990 [JP] Japan .................. 2-197738

[51] Int. Cl.$^5$ .................. G11B 5/52; G11B 5/17
[52] U.S. Cl. .................. 360/108; 360/84; 360/123
[58] Field of Search ............ 360/108, 107, 84, 130.24, 360/123-124

[56] References Cited

U.S. PATENT DOCUMENTS 4,497,004 1/1985 Shibata et al. .................. 360/108
4,598,325 7/1986 Tarzaiski .................. 360/108 X

FOREIGN PATENT DOCUMENTS 347997 12/1989 European Pat. Off. .
364725 4/1990 European Pat. Off. .
365092 4/1990 European Pat. Off. .

Primary Examiner—John H. Wolff
Attorney, Agent, or Firm—Sughrue, Mion, Zinn, Macpeak & Seas

[57] ABSTRACT

The rotary magnetic head apparatus of this invention exhibits an optimum transfer characteristic similar to that in the conventional apparatuses even when the number of coil turns for the magnetic head is reduced to 10 or less. This is achieved by setting the number of secondary winding turns for the rotary transformer to 16 or less and by setting the number of primary winding turns for the rotary transformer in such a way that a product of a step-up ratio—defined as the number of secondary winding turns divided by the number of primary winding turns—and the number of coil turns will be around 50. This reduction in the number of turns of coil on the magnetic head, from 20 or 25 with the conventional apparatus to less than 10, results in a substantial reduction in the cost of magnetic head and therefore the rotary magnetic head apparatus.

5 Claims, 2 Drawing Sheets

ROTARY MAGNETIC HEAD APPARATUS

BACKGROUND OF THE INVENTION

1. Field of the Invention

The present invention relates to a rotary magnetic head apparatus for recording signals on a magnetic tape as a recording medium and for reproducing signals recorded on the magnetic tape, and more particularly to a rotary magnetic head apparatus that can suitably be applied to a digital audio taperecorder or DAT.

2. Prior Art

At the initial stage of development, the digital audio taperecorders were close in size to 8-mm video taperecorders (VTRs), so that they used the 8-mm VTR specifications as is.

FIG. 1 shows a cross section of one example of a rotary magnetic head apparatus used on the DAT. In the figure, reference numeral 1 represents a chassis, and 2 a stationary drum mounted on the chassis 1. At the top of the stationary drum 2 is formed an annular recessed portion 2a. Motor 3 is mounted to the underside of the stationary drum 2. A motor shaft 3a passes through and projects above the stationary drum 2. Rotary drum 4 is secured to the shaft 3a that projects from the stationary drum 2. A magnetic head 5 is mounted on a mounting base 6, which is secured to the underside of the rotary drum 4, in such a way that the outer end of the magnetic head 5 slightly projects outwardly from the outer circumferential surfaces of the stationary drum 2 and of the rotary drum 4.

The magnetic head 5 has a coil, though not shown, connected to a primary winding 7a or 7b of a rotary transformer described later. Core 7 is located on the rotor side that forms a part of a rotary transformer and which is attached to the underside of the rotary drum 4 and provided with the primary windings 7a, 7b connected to the coil of the magnetic head 5. Core 8 is located on the stator side that forms a part of the rotary transformer and which is installed at the bottom of the recessed portion 2a of the stationary drum 2 in such a manner that it faces the rotor side core 7 with a gap formed therbetween (e.g. 30 to 50 μm) therebetween small enough to enhance a coupling coefficient between rotor side core 7 and stator side core 8. The stator side 8 is provided with secondary windings 8a, 8b at positions opposite to the primary windings 7a, 7b. T is a magnetic tape as a recording medium.

FIG. 2 shows a transfer characteristic of the rotary transformer in a frequency band in which it is used. In the figure, a represents a step-up ratio equal to the number of turns $n_S$ of the secondary windings 8a, 8b divided by the number of turns $n_P$ of the primary windings 7a, 7b; $E_O$ is an electromotive voltage; $E_i$ is an input voltage of a reproducing amplifier; and $f_r$ is a resonance frequency.

Now, the operation of the DAT will be explained.

As the motor 3 is started to rotate the rotary drum 4 mounted on the shaft 3a and the magnetic head 5 secured to the rotary drum 4 through the mounting base 6 is also rotated. With the rotary drum 4 and the magnetic head 5 rotating, the magnetic tape T is moved by a tape transport mechanism to record signals on or reproduce them from the magnetic tape T by the magnetic head 5.

The rotary transformer is used to supply signals, which are to be recorded on the magnetic tape T, from a recording amplifier to the magnetic head 5, and also to supply signals reproduced from the magnetic tape T by the magnetic head 5 to a reproduction or playback amplifier not shown.

Next, we will deal with the number of turns $n_H$ of coil on the magnetic head 5, the number of turns $n_P$ of the primary windings 7a, 7b on the rotary transformer, and the number of turns $n_S$ of the secondary windings 8a, 8b on the rotary transformer.

The rotary transformer is required to have as small a loss and as flat a transfer characteristic as possible in the service frequency band as shown by the solid line in FIG. 2. It is a general practice with VTR that the frequency of the white peak of a video signal is set to coincide with the resonance frequency $f_r$.

Thus, if we let the input capacity of the playback amplifier C, then the resonance frequency $f_r$ is expressed as $$f_r = \frac{1}{2\pi (C \cdot L_{SH})^{1/2}}$$

where $L_{SH}$ is an inductance of the rotary transformer impedance as seen from the secondary windings 8a, 8b.

Then, the inductance $L_{SH}$ is given by $$L_{SH} = a^2 \cdot L_P \left( 1 - \frac{K^2 \cdot L_P}{L_H + L_P} \right)$$

where $L_P$ is an inductance of the primary windings 7a, 7b of the rotary transformer; $L_H$ is an inductance of the coil of the magnetic head 5; and K is a coupling coefficient of the rotary transformer (usually 0.97 to 0.99; the greater the better).

Since the resonance frequency $f_r$ and the input capacity C are already known, the inductance $L_{SH}$ can now be determined.

Because the transfer characteristic of the rotary transformer is given by $$\frac{E_i}{E_0} = \left( \frac{L_{SH}}{L_P \left( 1 - \frac{K^2 \cdot L_P}{L_H + L_P} \right)} \right)^{1/2} \times \frac{K^2 \cdot L_P}{L_H + L_P}$$

Then the inductance $L_P$ that makes $E_i/E_O$ maximum is given by $$L_P = L_H \left( 1 - \frac{1}{1 - K^2} \right)^{1/2}$$

Now, the relationship between the two inductances $L_P$ and $L_H$ can be obtained.

The optimum step-up ratio a is expressed as $$a = \left( \frac{L_{SH}}{L_H} \right)^{1/2}$$

The number of turns of coil $n_H$, the number of turns of primary winding $n_P$ and the number of turns of secondary winding $n_S$ are determined so that they meet the above relationships. In general, $n_H$ is set at 20 to 25; $n_P$ at 3 to 5; $n_S$ at 6 to 15; and the step-up ratio a at 2 to 3.

The conventional rotary magnetic head apparatus is constructed as mentioned above. With the number of turns $n_H$, $n_P$, $n_S$ set as described above, the number of turns of coil $n_H$ for the magnetic head 5 should be in the range of 20 to 25. This means that it is necessary to pass the wire through a narrow gap as small as a needle hole repetitively 20 to 25 times. This coiling process is carried out either manually or by using an automatic wire winding machine.

It will generally take about three months before a workman is reasonably proficient at winding the wire to form 20 to 25 turns. When the coil is to be made by the automatic wire winding machine, a costly, high precision facility is required. The overall cost of the facility therefore is higher than that of manual work. This in turn raises the cost of magnetic head 5 and therefore the rotary magnetic head apparatus.

SUMMARY OF THE INVENTION

This invention has been accomplished to eliminate the above-mentioned drawback and its objective is to provide an inexpensive rotary magnetic head apparatus.

The rotary magnetic head apparatus of this invention takes advantage of the fact that, unlike the video taperecorder which has limitations on the number of turns of each winding to meet various characteristic requirements, the digital audio taperecorder has no such limitations. In this apparatus, the number of turns of coil for the magnetic head is set to 10 or less, the number of turns of secondary winding for the rotary transformer is set to 16 or less, and the number of turns of primary winding for the rotary transformer is set in such a manner that the step-up ratio—the number of turns of secondary winding divided by the number of turns of primary winding—multiplied by the number of turns of the magnetic head coil becomes approximately 50.

Since the rotary magnetic head apparatus according to this invention is applied to DAT's, it is free from such limitations on the number of turns of each winding as imposed on VTR's. Therefore, the desired characteristic of DAT can be obtained even when the number of turns of coil is set to 10 or less, the number of turns of secondary winding is set to 16 or less, and the number of turns of primary winding is set so that the step-up ratio multiplied by the number of turns of the head coil becomes about 50.

PREFERRED EMBODIMENTS OF THE INVENTION

Some embodiments of this invention will be described by referring to the accompanying drawings.

Figure 1:
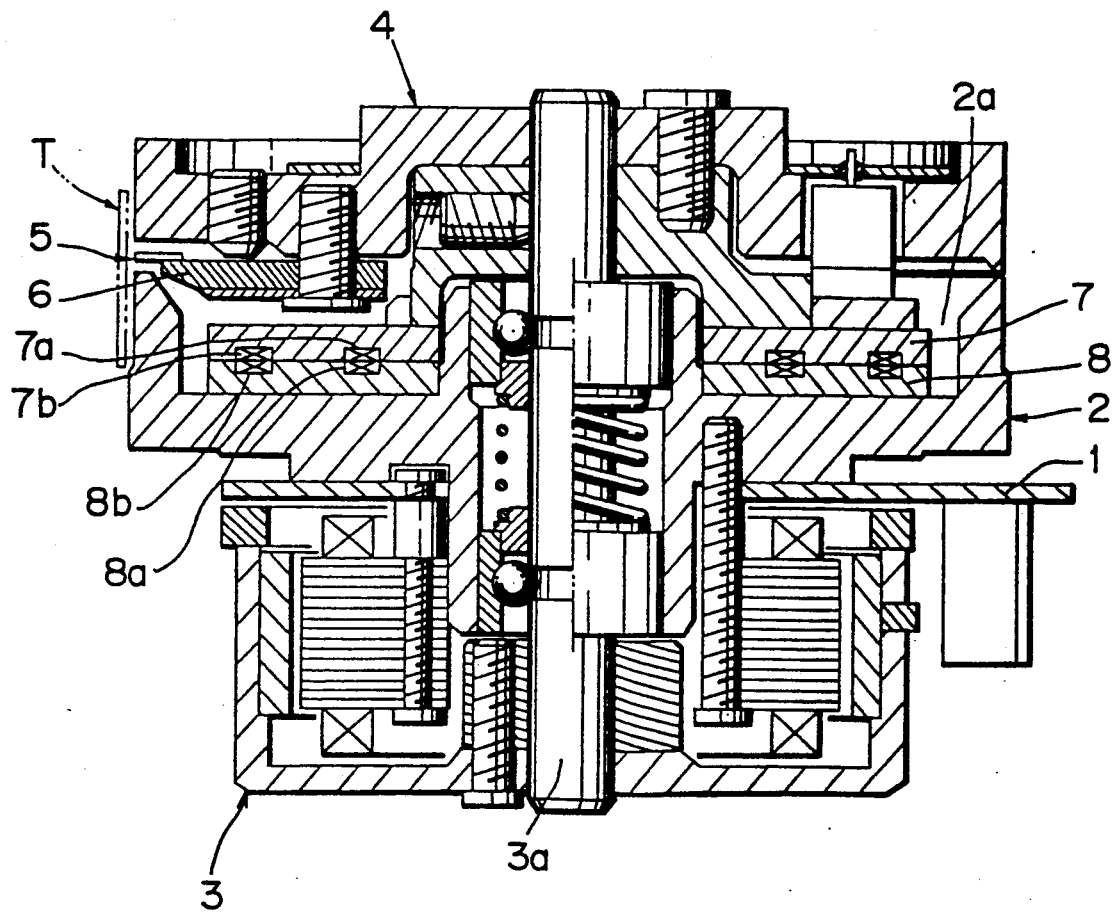
FIG. 1 is a cross section of one example of a rotary magnetic head apparatus.
Figure 2:
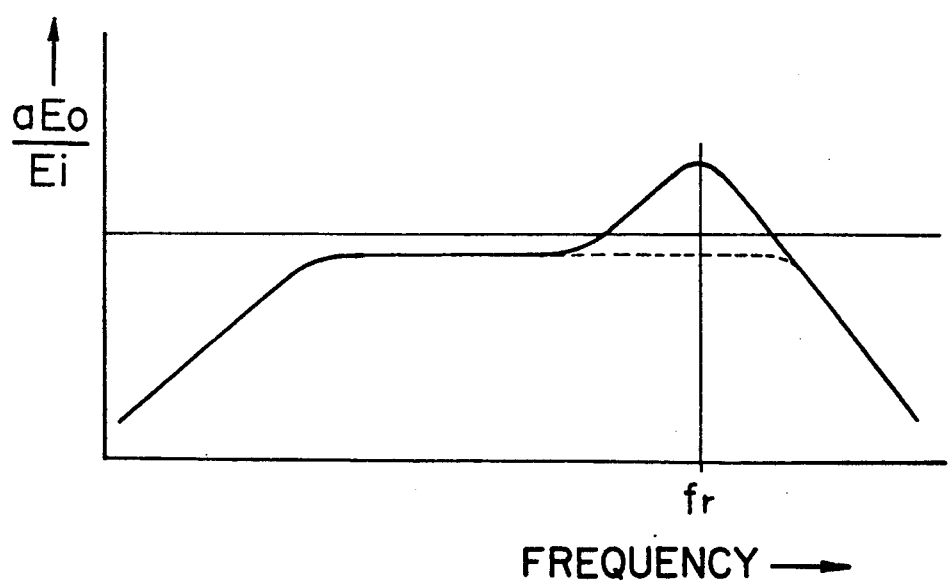
FIG. 2 is a diagram showing the transfer characteristic in a frequency range in which the rotary transformer is used.

Because DAT processes signals digitally, it does not require as high a signal-to-noise ratio or SN ratio as required by the VTR but only the transfer characteristic represented by the dashed line in FIG. 2.

Based on this fact, we examined characteristics of various configurations of the rotary magnetic head apparatuses under the conditions that the number of turns of coil $n_H$ multiplied by the step-up ratio a is kept at around 50 and that the output from the secondary of the rotary transformer is kept almost constant.

A first configuration of the rotary magnetic head apparatus that we examined has the number of coil turns $n_H$ set to 10, the number of primary winding turns of the rotary transformer $n_S$ set to 10, the step-up ratio a set to 5, and $a \cdot n_H$ set to 50. This configuration exhibited an equivalent characteristic to that of the conventional apparatus.

In a second configuration of the rotary magnetic head apparatus, the coil turns number $n_H$ is set to 5, the primary winding turns number $n_P$ to 1, the secondary winding turns number $n_S$ to 10, the step-up ratio a to 10, and $a \cdot n_H$ to 50. The second configuration has a lower output on the secondary side than that of the conventional apparatus and its block error rate is of the order of $10^{-3}$ as opposed to $10^{-4}$ for the conventional apparatus. Since errors can be corrected if the block error rate is lower than $10^{-2}$, the second configuration raises no problem in practical use.

In addition to the above two configurations, we also the following cases: a third case in which the settings are such that the coil turns number $n_H=7$, the primary winding turns number $n_P=1$, the secondary winding turns number $n_S=7$, the step-up ratio $a=7$, and $a \cdot n_H=49$; a fourth case where $n_H=6$, $n_P=1$, $n_S=8$, $a=8$, and $a \cdot n_H=48$; a fifth case where $n_H=4$, $n_P=1$, $n_S=12$, $a=12$, and $a \cdot n_H=48$; and a sixth case where $n_H=3$, $n_P=1$, $n_S=16$, $a=16$, and $a \cdot n_H=48$. In these cases, the similar characteristics to those of the conventional apparatuses were also obtained.

As described above, setting the numbers of winding turns $n_H$, $n_P$, $n_S$ to appropriate values permits the apparatus to have a desired characteristic. And because the number of turns of coil $n_H$ is not greater than 10, the cost of the magnetic head 5 can be reduced by about 40% greatly contributing to a reduction in the overall cost of the rotary magnetic head apparatus.

Although there may be cases where the number of secondary winding turns $n_S$ of the rotary transformer will become larger than that of the conventional apparatuses, the secondary winding can be wound by using the automatic winding machine, so that the cost of the apparatus remains almost the same.

In the rotary magnetic head apparatus of this invention, the coil and primary windings 7a, 7b may be increased in diameter not only to reduce the magnetic flux leakage but also prevent deterioration of the coupling coefficient.

When the number of primary winding turns $n_P$ is set at 1, it is recommended that a flat winding be used as the primary winding 7a, 7b.

Characteristics similar to those of the first two cases can also be obtained even when the number of coil turns $n_H$ is set lower than the number of secondary winding turns $n_S$ or when it is set below the step-up ratio a. The apparatuses with such characteristics can produce similar effects to those of the apparatuses with the first two configurations.

The above-mentioned value of about 50 (the number of coil turns $n_H$ multiplied by the step-up ratio a) may be in the range of 45 to 56.

As mentioned above, the rotary magnetic head apparatus of this invention achieves a desired characteristic by setting the number of coil turns for the magnetic head to 10 or less, the number of secondary winding turns for the rotary transformer to 16 or less, and also by setting the number of primary winding turns for the rotary transformer in such a way that a product of a step-up ratio—as the number of secondary winding turns divided by the number of primary winding turns—and the number of coil turns will be around 50. This configuration makes it possible to reduce the number of coil turns of the head, which in turn contributes to a reduction in the cost of the magnetic head and therefore the rotary magnetic head apparatus.

What is claimed is:

1. A rotary magnetic head apparatus comprising:
   a rotary transformer having a primary winding and a secondary winding; and
   a rotating magnetic head having a coil which is connected to the primary winding of the rotary transformer;
   whereby the number of turns of said coil on the magnetic head is set to 10 or less, the number of turns of said secondary winding on the rotary transformer is set to 16 or less, and the number of turns of said primary winding on the rotary transformer is set so that a product of a step-up ratio "a"—defined as the number of secondary winding turns divided by the number of primary winding turns—and the number of turns of said coil "$n_H$" satisfies the following equation:

$$a \times n_H \approx 50.$$

2. A rotary magnetic head apparatus as claimed in claim 1, wherein said number of turns of said coil on the magnetic head is 10, the number of turns of said primary winding on the rotary transformer is 2, and the number of turns of said secondary winding on the rotary transformer is 10.

3. A rotary magnetic head apparatus as claimed in claim 1, wherein said number of turns of said coil on the magnetic head is not greater than the number of turns of said secondary winding on the rotary transformer.

4. A rotary magnetic head apparatus as claimed in claim 1, wherein said number of turns of said coil on the magnetic head is not greater than the step-up ratio.

5. A rotary magnetic head apparatus as claimed in claim 1, wherein said product of the step-up ratio and the number of turns of said coil falls in the range of 45 to 56.

* * * * *